(12) United States Patent
Croy et al.

(10) Patent No.: US 7,626,951 B2
(45) Date of Patent: Dec. 1, 2009

(54) VOICE OVER INTERNET PROTOCOL (VOIP) LOCATION BASED CONFERENCING

(75) Inventors: Jon Croy, Seattle, WA (US); John Gordon Hines, Kirkland, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 12 days.

(21) Appl. No.: 11/503,908

(22) Filed: Aug. 15, 2006

(65) Prior Publication Data

US 2007/0091906 A1  Apr. 26, 2007

Related U.S. Application Data

(60) Provisional application No. 60/733,789, filed on Nov. 7, 2005, provisional application No. 60/723,961, filed on Oct. 6, 2005, provisional application No. 60/723,960, filed on Oct. 6, 2005.

(51) Int. Cl.
*H04L 12/16* (2006.01)

(52) U.S. Cl. .................................. 370/261; 370/401

(58) Field of Classification Search ................ None
See application file for complete search history.

(56) References Cited

U.S. PATENT DOCUMENTS

| | | |
|---|---|---|
| 1,103,073 A | 7/1914 | O'Connell |
| 4,445,118 A | 4/1984 | Taylor et al. |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |

(Continued)

FOREIGN PATENT DOCUMENTS

WO  WO9921380  4/1999

(Continued)

OTHER PUBLICATIONS

Le-Pond Chin Jyh-Hong Wen Ting-Way Liu, The study of the interconnection of GSM mobile communication system over IP based network, May 6, 2001, IEEE, Vehicular Technology Conference, vol. 3, pp. 2219-2223.*

(Continued)

*Primary Examiner*—Jayanti K Patel
*Assistant Examiner*—Hooman Houshmand
(74) *Attorney, Agent, or Firm*—William H. Bollman

(57) ABSTRACT

A Voice Over Internet Protocol (VoIP) device uses its location to narrow down known and unknown potential VoIP third parties meeting the user's criteria, based on their physical proximity to the initial caller and other pre-determined characteristics, to join in a phone conference. A VoIP soft switch includes conference bridges that eliminate the conventional requirement that they dial digits for a direct link with another specific VoIP communications device. Instead, location information relating to the initial VoIP user is passed to the VoIP conference bridge, either from the user's VoIP communication device or from their respective location server. The location information is then compared by the VoIP soft switch against other VoIP devices to find potential VoIP users within a defined geographic region surrounding the initial VoIP user. Those VoIP users matching the criteria are sent an Invite message to join the conference, which they may or may not accept.

15 Claims, 6 Drawing Sheets

U.S. PATENT DOCUMENTS

| | | | |
|---|---|---|---|
| 4,891,650 | A | 1/1990 | Sheffer |
| 4,952,928 | A | 8/1990 | Carroll et al. |
| 4,972,484 | A | 11/1990 | Theile et al. |
| 5,014,206 | A | 5/1991 | Scribner et al. |
| 5,043,736 | A | 8/1991 | Darnell et al. |
| 5,055,851 | A | 10/1991 | Sheffer |
| 5,068,656 | A | 11/1991 | Sutherland |
| 5,068,891 | A | 11/1991 | Marshall |
| 5,070,329 | A | 12/1991 | Jasinaki |
| 5,081,667 | A | 1/1992 | Drori et al. |
| 5,119,104 | A | 6/1992 | Heller |
| 5,126,722 | A | 6/1992 | Kamis |
| 5,144,283 | A | 9/1992 | Arens et al. |
| 5,161,180 | A | 11/1992 | Chavous |
| 5,166,972 | A | 11/1992 | Smith |
| 5,177,478 | A | 1/1993 | Wagai et al. |
| 5,193,215 | A | 3/1993 | Olmer |
| 5,208,756 | A | 5/1993 | Song |
| 5,214,789 | A | 5/1993 | George |
| 5,218,367 | A | 6/1993 | Sheffer et al. |
| 5,223,844 | A | 6/1993 | Mansell et al. |
| 5,239,570 | A | 8/1993 | Koster et al. |
| 5,265,630 | A | 11/1993 | Hartman et al. |
| 5,266,944 | A | 11/1993 | Carroll et al. |
| 5,283,570 | A | 2/1994 | DeLuca et al. |
| 5,289,527 | A | 2/1994 | Tiedemann, Jr. |
| 5,293,642 | A | 3/1994 | Lo |
| 5,299,132 | A | 3/1994 | Wortham |
| 5,301,354 | A | 4/1994 | Schwendeman et al. |
| 5,311,516 | A | 5/1994 | Kuznicki et al. |
| 5,325,302 | A | 6/1994 | Izidon et al. |
| 5,327,529 | A | 7/1994 | Fults et al. |
| 5,334,974 | A | 8/1994 | Simms et al. |
| 5,335,246 | A | 8/1994 | Yokev et al. |
| 5,343,493 | A | 8/1994 | Karimullah |
| 5,347,568 | A | 9/1994 | Moody et al. |
| 5,351,235 | A | 9/1994 | Lahtinen |
| 5,361,212 | A | 11/1994 | Class et al. |
| 5,363,425 | A | 11/1994 | Mufti et al. |
| 5,365,451 | A | 11/1994 | Wang et al. |
| 5,374,936 | A | 12/1994 | Feng |
| 5,379,451 | A | 1/1995 | Nakagoshi et al. |
| 5,381,338 | A | 1/1995 | Wysocki et al. |
| 5,387,993 | A | 2/1995 | Heller et al. |
| 5,388,147 | A | 2/1995 | Grimes |
| 5,390,339 | A | 2/1995 | Bruckert et al. |
| 5,394,158 | A | 2/1995 | Chia |
| 5,396,227 | A | 3/1995 | Carroll et al. |
| 5,398,190 | A | 3/1995 | Wortham |
| 5,406,614 | A | 4/1995 | Hara |
| 5,418,537 | A | 5/1995 | Bird |
| 5,422,813 | A | 6/1995 | Schuchman et al. |
| 5,423,076 | A | 6/1995 | Westergren et al. |
| 5,432,841 | A | 7/1995 | Rimer |
| 5,434,789 | A | 7/1995 | Fraker et al. |
| 5,454,024 | A | 9/1995 | Lebowitz |
| 5,461,390 | A | 10/1995 | Hoshen |
| 5,470,233 | A | 11/1995 | Fruchterman et al. |
| 5,479,408 | A | 12/1995 | Will |
| 5,479,482 | A | 12/1995 | Grimes |
| 5,485,161 | A | 1/1996 | Vaughn |
| 5,485,163 | A | 1/1996 | Singer et al. |
| 5,488,563 | A | 1/1996 | Chazelle et al. |
| 5,494,091 | A | 2/1996 | Freeman et al. |
| 5,497,149 | A | 3/1996 | Fast |
| 5,504,491 | A | 4/1996 | Chapman |
| 5,506,886 | A | 4/1996 | Maine et al. |
| 5,508,931 | A | 4/1996 | Snider |
| 5,513,243 | A | 4/1996 | Kage |
| 5,515,287 | A | 5/1996 | Hakoyama et al. |
| 5,517,199 | A | 5/1996 | DiMattei |
| 5,519,403 | A | 5/1996 | Bickley et al. |
| 5,530,655 | A | 6/1996 | Lokhoff et al. |
| 5,530,914 | A | 6/1996 | McPheters |
| 5,532,690 | A | 7/1996 | Hertel |
| 5,535,434 | A | 7/1996 | Siddoway et al. |
| 5,539,395 | A | 7/1996 | Buss et al. |
| 5,539,398 | A | 7/1996 | Hall et al. |
| 5,539,829 | A | 7/1996 | Lokhoff et al. |
| 5,543,776 | A | 8/1996 | L'Esperance et al. |
| 5,546,445 | A | 8/1996 | Dennison et al. |
| 5,552,772 | A | 9/1996 | Janky et al. |
| 5,555,286 | A | 9/1996 | Tendler |
| 5,568,119 | A | 10/1996 | Schipper et al. |
| 5,568,153 | A | 10/1996 | Beliveau |
| 5,574,648 | A | 11/1996 | Pilley |
| 5,579,372 | A | 11/1996 | ÅStröm |
| 5,588,009 | A | 12/1996 | Will |
| 5,592,535 | A | 1/1997 | Klotz |
| 5,594,780 | A | 1/1997 | Wiedeman et al. |
| 5,604,486 | A | 2/1997 | Lauro et al. |
| 5,606,313 | A | 2/1997 | Allen et al. |
| 5,606,618 | A | 2/1997 | Lokhoff et al. |
| 5,606,850 | A | 3/1997 | Nakamura |
| 5,610,815 | A | 3/1997 | Gudat et al. |
| 5,614,890 | A | 3/1997 | Fox |
| 5,615,116 | A | 3/1997 | Gudat et al. |
| 5,621,793 | A | 4/1997 | Bednarek et al. |
| 5,628,051 | A | 5/1997 | Salin |
| 5,629,693 | A | 5/1997 | Janky |
| 5,633,912 | A | 5/1997 | Tsoi |
| 5,636,276 | A | 6/1997 | Brugger |
| 5,661,652 | A | 8/1997 | Sprague et al. |
| 5,661,755 | A | 8/1997 | Van De Kerkhof et al. |
| 5,682,600 | A | 10/1997 | Salin |
| 5,689,245 | A | 11/1997 | Noreen et al. |
| 5,699,053 | A | 12/1997 | Jonsson |
| 5,704,029 | A | 12/1997 | Wright, Jr. |
| 5,721,781 | A | 2/1998 | Deo et al. |
| 5,731,785 | A | 3/1998 | Lemelson et al. |
| 5,740,534 | A | 4/1998 | Ayerst et al. |
| 5,761,618 | A | 6/1998 | Lynch et al. |
| 5,765,152 | A | 6/1998 | Erickson |
| 5,767,795 | A | 6/1998 | Schaphorst |
| 5,768,509 | A | 6/1998 | Gunluk |
| 5,771,353 | A | 6/1998 | Eggleston et al. |
| 5,774,533 | A | 6/1998 | Patel |
| 5,774,670 | A | 6/1998 | Montulli |
| 5,787,357 | A | 7/1998 | Salin |
| 5,794,142 | A | 8/1998 | Vanttila et al. |
| 5,797,094 | A | 8/1998 | Houde et al. |
| 5,797,096 | A | 8/1998 | Lupien et al. |
| 5,802,492 | A | 9/1998 | DeLorme et al. |
| 5,806,000 | A | 9/1998 | Vo et al. |
| 5,809,415 | A | 9/1998 | Rossmann |
| 5,812,086 | A | 9/1998 | Bertiger et al. |
| 5,812,087 | A | 9/1998 | Krasner |
| 5,822,700 | A | 10/1998 | Hult et al. |
| 5,828,740 | A | 10/1998 | Khuc et al. |
| 5,835,907 | A | 11/1998 | Newman |
| 5,841,396 | A | 11/1998 | Krasner |
| 5,857,201 | A | 1/1999 | Wright, Jr. et al. |
| 5,864,667 | A | 1/1999 | Barkan |
| 5,874,914 | A | 2/1999 | Krasner |
| 5,896,369 | A | 4/1999 | Warsta et al. |
| 5,920,821 | A | 7/1999 | Seazholtz et al. |
| 5,922,074 | A | 7/1999 | Richard et al. |
| 5,930,250 | A | 7/1999 | Klok et al. |
| 5,930,701 | A | 7/1999 | Skog |
| 5,943,399 | A | 8/1999 | Bannister et al. |
| 5,945,944 | A | 8/1999 | Krasner |
| 5,946,629 | A | 8/1999 | Sawyer et al. |
| 5,946,630 | A | 8/1999 | Willars et al. |
| 5,950,130 | A | 9/1999 | Coursey |

| | | |
|---|---|---|
| 5,950,137 A | 9/1999 | Kim |
| 5,953,398 A | 9/1999 | Hill |
| 5,960,362 A | 9/1999 | Grob et al. |
| 5,974,054 A | 10/1999 | Couts et al. |
| 5,978,685 A | 11/1999 | Laiho |
| 5,983,099 A | 11/1999 | Yao et al. |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithil et al. |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe et al. |
| 6,070,067 A | 5/2000 | Nguyen et al. |
| 6,075,982 A | 6/2000 | Donovan et al. |
| 6,081,229 A | 6/2000 | Soliman et al. |
| 6,081,508 A | 6/2000 | West et al. |
| 6,085,320 A | 7/2000 | Kaliski, Jr. |
| 6,101,378 A | 8/2000 | Barabash et al. |
| 6,104,931 A | 8/2000 | Havinis et al. |
| 6,122,503 A | 9/2000 | Daly |
| 6,122,520 A | 9/2000 | Want et al. |
| 6,124,810 A | 9/2000 | Segal et al. |
| 6,131,067 A | 10/2000 | Girerd et al. |
| 6,133,874 A | 10/2000 | Krasner |
| 6,134,483 A | 10/2000 | Vayanos et al. |
| 6,138,003 A | 10/2000 | Kingdon et al. |
| 6,148,197 A | 11/2000 | Bridges et al. |
| 6,148,198 A | 11/2000 | Anderson et al. |
| 6,149,353 A | 11/2000 | Nilsson |
| 6,150,980 A | 11/2000 | Krasner |
| 6,154,172 A | 11/2000 | Piccionelli et al. |
| 6,169,891 B1 | 1/2001 | Gorham et al. |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider et al. |
| 6,178,506 B1 | 1/2001 | Quick, Jr. |
| 6,181,935 B1 | 1/2001 | Gossman et al. |
| 6,185,427 B1 | 2/2001 | Krasner et al. |
| 6,188,354 B1 | 2/2001 | Soliman et al. |
| 6,188,752 B1 | 2/2001 | Lesley |
| 6,188,909 B1 | 2/2001 | Alanara et al. |
| 6,189,098 B1 | 2/2001 | Kaliski, Jr. |
| 6,195,557 B1 | 2/2001 | Havinis et al. |
| 6,198,431 B1 | 3/2001 | Gibson |
| 6,199,045 B1 | 3/2001 | Giniger et al. |
| 6,199,113 B1 | 3/2001 | Alegre et al. |
| 6,205,330 B1 | 3/2001 | Winbladh |
| 6,208,290 B1 | 3/2001 | Krasner |
| 6,208,854 B1 | 3/2001 | Roberts et al. |
| 6,215,441 B1 | 4/2001 | Moeglein et al. |
| 6,219,557 B1 | 4/2001 | Havinis |
| 6,223,046 B1 | 4/2001 | Hamill-Keays et al. |
| 6,226,529 B1 | 5/2001 | Bruno et al. |
| 6,239,742 B1 | 5/2001 | Krasner |
| 6,247,135 B1 | 6/2001 | Feague |
| 6,249,680 B1 | 6/2001 | Wax et al. |
| 6,249,744 B1 | 6/2001 | Morita |
| 6,249,873 B1 | 6/2001 | Richard et al. |
| 6,253,203 B1 | 6/2001 | O'Flaherty et al. |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat et al. |
| 6,317,594 B1 | 11/2001 | Gossman et al. |
| 6,321,091 B1 | 11/2001 | Holland |
| 6,321,092 B1 | 11/2001 | Fitch |
| 6,321,257 B1 | 11/2001 | Kotola et al. |
| 6,324,542 B1 | 11/2001 | Wright, Jr. et al. |
| 6,327,473 B1 | 12/2001 | Soliman et al. |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross et al. |
| 6,360,102 B1 | 3/2002 | Havinis |
| 6,363,254 B1 | 3/2002 | Jones et al. |
| 6,367,019 B1 | 4/2002 | Ansell et al. |
| 6,370,389 B1 | 4/2002 | Isomursu et al. |
| 6,377,209 B1 | 4/2002 | Krasner |
| 6,377,810 B1 | 4/2002 | Geiger et al. |
| 6,400,314 B1 | 6/2002 | Krasner |
| 6,400,958 B1 | 6/2002 | Isomursu et al. |
| 6,411,254 B1 | 6/2002 | Moeglein et al. |
| 6,421,002 B2 | 7/2002 | Krasner |
| 6,433,734 B1 | 8/2002 | Krasner |
| 6,434,381 B1 | 8/2002 | Moore et al. |
| 6,442,391 B1 | 8/2002 | Johansson et al. |
| 6,449,473 B1 | 9/2002 | Raivisto |
| 6,449,476 B1 | 9/2002 | Hutchison, IV et al. |
| 6,456,852 B2 | 9/2002 | Bar et al. |
| 6,463,272 B1 | 10/2002 | Wallace et al. |
| 6,477,150 B1 | 11/2002 | Maggenti et al. |
| 6,504,491 B1 | 1/2003 | Christians |
| 6,505,049 B1 | 1/2003 | Dorenbosch |
| 6,510,387 B2 | 1/2003 | Fuchs et al. |
| 6,512,922 B1 | 1/2003 | Burg et al. |
| 6,512,930 B2 | 1/2003 | Sandegren |
| 6,515,623 B2 | 2/2003 | Johnson |
| 6,519,466 B2 | 2/2003 | Pande et al. |
| 6,522,682 B1 | 2/2003 | Kohli et al. |
| 6,529,829 B2 | 3/2003 | Turetzky et al. |
| 6,531,982 B1 | 3/2003 | White et al. |
| 6,538,757 B1 | 3/2003 | Sansone |
| 6,539,200 B1 | 3/2003 | Schiff |
| 6,539,232 B2 * | 3/2003 | Hendrey et al. ......... 455/456.1 |
| 6,539,304 B1 | 3/2003 | Chansarkar |
| 6,542,464 B1 | 4/2003 | Takeda et al. |
| 6,542,734 B1 | 4/2003 | Abrol et al. |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko et al. |
| 6,556,832 B1 | 4/2003 | Soliman |
| 6,560,461 B1 | 5/2003 | Fomukong et al. |
| 6,560,534 B2 | 5/2003 | Abraham et al. |
| 6,570,530 B2 | 5/2003 | Gaal et al. |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno et al. |
| 6,600,927 B2 | 7/2003 | Hamilton |
| 6,609,004 B1 | 8/2003 | Morse et al. |
| 6,611,757 B2 | 8/2003 | Brodie |
| 6,618,593 B1 | 9/2003 | Drutman et al. |
| 6,618,670 B1 | 9/2003 | Chansarkar |
| 6,621,452 B2 | 9/2003 | Knockeart et al. |
| 6,628,233 B2 | 9/2003 | Knockeart et al. |
| 6,633,255 B2 | 10/2003 | Krasner |
| 6,640,184 B1 | 10/2003 | Rabe |
| 6,650,288 B1 | 11/2003 | Pitt et al. |
| 6,661,372 B1 | 12/2003 | Girerd et al. |

| | | | | | | |
|---|---|---|---|---|---|---|
| 6,665,539 B2 | 12/2003 | Sih et al. | | 6,865,395 B2 | 3/2005 | Riley |
| 6,665,541 B1 | 12/2003 | Krasner et al. | | 6,867,733 B2 | 3/2005 | Sandhu et al. |
| 6,671,620 B1 | 12/2003 | Garin et al. | | 6,867,734 B2 | 3/2005 | Voor et al. |
| 6,677,894 B2 | 1/2004 | Sheynblat et al. | | 6,873,854 B2 | 3/2005 | Crockett et al. |
| 6,680,694 B1 | 1/2004 | Knockeart et al. | | 6,882,850 B2 * | 4/2005 | McConnell et al. ......... 455/453 |
| 6,680,695 B2 | 1/2004 | Turetzky et al. | | 6,885,874 B2 | 4/2005 | Grube et al. |
| 6,691,019 B2 | 2/2004 | Seeley et al. | | 6,885,940 B2 | 4/2005 | Brodie et al. |
| 6,694,258 B2 | 2/2004 | Johnson et al. | | 6,888,497 B2 | 5/2005 | King et al. |
| 6,697,629 B1 | 2/2004 | Grilli et al. | | 6,888,932 B2 | 5/2005 | Snip et al. |
| 6,698,195 B1 | 3/2004 | Hellinger | | 6,895,238 B2 | 5/2005 | Newell et al. |
| 6,701,144 B2 | 3/2004 | Kirbas et al. | | 6,895,249 B2 | 5/2005 | Gaal |
| 6,703,971 B2 | 3/2004 | Pande et al. | | 6,900,758 B1 | 5/2005 | Mann et al. |
| 6,703,972 B2 | 3/2004 | van Diggelen | | 6,903,684 B1 | 6/2005 | Simic et al. |
| 6,704,651 B2 | 3/2004 | van Diggelen | | 6,904,029 B2 | 6/2005 | Fors et al. |
| 6,707,421 B1 | 3/2004 | Drury et al. | | 6,907,224 B2 | 6/2005 | Younis |
| 6,714,793 B1 | 3/2004 | Carey et al. | | 6,907,238 B2 | 6/2005 | Leung |
| 6,718,174 B2 | 4/2004 | Vayanos | | 6,912,230 B1 | 6/2005 | Salkini |
| 6,720,915 B2 | 4/2004 | Sheynblat | | 6,912,395 B2 | 6/2005 | Benes et al. |
| 6,721,578 B2 | 4/2004 | Minear et al. | | 6,912,545 B1 | 6/2005 | Lundy et al. |
| 6,721,871 B2 | 4/2004 | Piispanen et al. | | 6,915,208 B2 | 7/2005 | Garin et al. |
| 6,724,342 B2 | 4/2004 | Bloebaum et al. | | 6,917,331 B2 | 7/2005 | Gronemeyer |
| 6,725,159 B2 | 4/2004 | Krasner | | 6,930,634 B2 | 8/2005 | Peng et al. |
| 6,728,701 B1 | 4/2004 | Stoica | | 6,937,187 B2 | 8/2005 | van Diggelen et al. |
| 6,731,940 B1 | 5/2004 | Nagendran | | 6,937,872 B2 | 8/2005 | Krasner |
| 6,734,821 B2 | 5/2004 | van Diggelen | | 6,940,950 B2 | 9/2005 | Dickinson et al. |
| 6,738,013 B2 | 5/2004 | Orler et al. | | 6,941,144 B2 | 9/2005 | Stein |
| 6,738,800 B1 | 5/2004 | Aquilon et al. | | 6,944,540 B2 | 9/2005 | King et al. |
| 6,741,842 B2 | 5/2004 | Goldberg et al. | | 6,947,772 B2 | 9/2005 | Minear et al. |
| 6,744,856 B2 | 6/2004 | Karnik et al. | | 6,950,058 B1 | 9/2005 | Davis et al. |
| 6,744,858 B1 | 6/2004 | Ryan et al. | | 6,957,073 B2 | 10/2005 | Bye |
| 6,745,038 B2 | 6/2004 | Callaway, Jr. et al. | | 6,961,562 B2 | 11/2005 | Ross |
| 6,747,596 B2 | 6/2004 | Orler et al. | | 6,963,557 B2 | 11/2005 | Knox |
| 6,748,195 B1 | 6/2004 | Phillips | | 6,965,754 B2 | 11/2005 | King |
| 6,751,464 B1 | 6/2004 | Burg et al. | | 6,965,767 B2 | 11/2005 | Maggenti et al. |
| 6,756,938 B2 | 6/2004 | Zhao et al. | | 6,970,917 B1 | 11/2005 | Kushwaha et al. |
| 6,757,544 B2 | 6/2004 | Rangarajan et al. | | 6,973,320 B2 | 12/2005 | Brown et al. |
| 6,757,545 B2 | 6/2004 | Nowak et al. | | 6,975,266 B2 | 12/2005 | Abraham et al. |
| 6,771,639 B1 | 8/2004 | Holden | | 6,978,453 B2 | 12/2005 | Rao et al. |
| 6,771,742 B2 | 8/2004 | McCalmont et al. | | 6,980,816 B2 | 12/2005 | Rohles et al. |
| 6,771,971 B2 | 8/2004 | Smith | | 6,985,747 B2 | 1/2006 | Chithambaram |
| 6,772,340 B1 | 8/2004 | Peinado et al. | | 6,990,081 B2 | 1/2006 | Schaefer et al. |
| 6,775,255 B1 | 8/2004 | Roy | | 6,993,355 B1 | 1/2006 | Pershan |
| 6,775,655 B1 | 8/2004 | Peinado et al. | | 6,996,720 B1 | 2/2006 | DeMello et al. |
| 6,775,802 B2 | 8/2004 | Gaal | | 6,999,782 B2 | 2/2006 | Shaughnessy et al. |
| 6,778,136 B2 | 8/2004 | Gronemeyer | | 7,024,321 B1 | 4/2006 | Deninger et al. |
| 6,778,885 B2 | 8/2004 | Agashe et al. | | 7,024,393 B1 | 4/2006 | Peinado et al. |
| 6,781,963 B2 | 8/2004 | Crockett et al. | | 7,047,411 B1 | 5/2006 | DeMello et al. |
| 6,788,249 B1 | 9/2004 | Farmer et al. | | 7,065,351 B2 | 6/2006 | Carter et al. |
| 6,795,699 B1 | 9/2004 | McCraw et al. | | 7,072,667 B2 | 7/2006 | Olrik |
| 6,799,049 B1 | 9/2004 | Zellner et al. | | 7,079,857 B2 | 7/2006 | Maggenti et al. |
| 6,799,050 B1 | 9/2004 | Krasner | | 7,103,018 B1 | 9/2006 | Hansen et al. |
| 6,801,159 B2 | 10/2004 | Swope et al. | | 7,103,574 B1 | 9/2006 | Peinado et al. |
| 6,804,524 B1 | 10/2004 | Vandermeijden | | 7,106,717 B2 | 9/2006 | Rousseau et al. |
| 6,807,534 B1 | 10/2004 | Erickson | | 7,110,773 B1 | 9/2006 | Wallace |
| 6,810,323 B1 | 10/2004 | Bullock et al. | | 7,136,838 B1 | 11/2006 | Peinado et al. |
| 6,813,264 B2 | 11/2004 | Vassilovski | | 7,151,946 B2 | 12/2006 | Maggenti et al. |
| 6,813,560 B2 | 11/2004 | van Diggelen et al. | | 7,177,397 B2 | 2/2007 | McCalmont |
| 6,816,111 B2 | 11/2004 | Krasner | | 7,177,399 B2 | 2/2007 | Dawson |
| 6,816,710 B2 | 11/2004 | Krasner | | 7,209,758 B1 | 4/2007 | Moll et al. |
| 6,816,719 B1 | 11/2004 | Heinonen et al. | | 7,209,969 B2 | 4/2007 | Lahti et al. |
| 6,816,734 B2 | 11/2004 | Wong et al. | | 7,218,940 B2 | 5/2007 | Niemenmaa et al. |
| 6,820,269 B2 | 11/2004 | Baucke et al. | | 7,221,959 B2 | 5/2007 | Lindqvist et al. |
| 6,829,475 B1 | 12/2004 | Lee et al. | | 7,245,900 B1 | 7/2007 | Lamb |
| 6,832,373 B2 | 12/2004 | O'Neill | | 7,260,384 B2 | 8/2007 | Bales et al. |
| 6,839,020 B2 | 1/2005 | Geier et al. | | 7,333,480 B1 | 2/2008 | Clarke |
| 6,839,021 B2 | 1/2005 | Sheynblat et al. | | 7,428,571 B2 | 9/2008 | Ichimura |
| 6,839,417 B2 * | 1/2005 | Weisman et al. ....... 379/204.01 | | 7,440,442 B2 | 10/2008 | Grabelsky et al. |
| 6,842,715 B1 | 1/2005 | Gaal | | 2001/0011247 A1 | 8/2001 | O'Flaherty et al. |
| 6,847,822 B1 | 1/2005 | Dennison et al. | | 2001/0021646 A1 | 9/2001 | Antonucci et al. |
| 6,853,916 B2 | 2/2005 | Fuchs et al. | | 2002/0037735 A1 | 3/2002 | Maggenti et al. |
| 6,856,282 B2 | 2/2005 | Mauro et al. | | 2002/0052214 A1 | 5/2002 | Maggenti et al. |
| 6,861,980 B1 | 3/2005 | Rowitch et al. | | 2002/0061760 A1 | 5/2002 | Maggenti et al. |
| 6,865,171 B1 | 3/2005 | Nilsson | | 2002/0069529 A1 | 6/2002 | Wieres |

| | | |
|---|---|---|
| 2002/0098832 A1 | 7/2002 | Fleischer et al. |
| 2002/0102996 A1 | 8/2002 | Jenkins |
| 2002/0102999 A1 | 8/2002 | Maggenti et al. |
| 2002/0111172 A1 | 8/2002 | DeWolf et al. |
| 2002/0112047 A1 | 8/2002 | Kushwaha et al. |
| 2002/0138650 A1 | 9/2002 | Yamamoto et al. |
| 2002/0173317 A1 | 11/2002 | Nykanen |
| 2002/0191595 A1 | 12/2002 | Mar |
| 2003/0009602 A1 | 1/2003 | Jacobs et al. |
| 2003/0013449 A1 | 1/2003 | Hose et al. |
| 2003/0016804 A1 | 1/2003 | Sheha et al. |
| 2003/0037163 A1 | 2/2003 | Kitada et al. |
| 2003/0040272 A1 | 2/2003 | Lelievre et al. |
| 2003/0065788 A1 | 4/2003 | Salomaki |
| 2003/0069002 A1 | 4/2003 | Hunter et al. |
| 2003/0072318 A1 | 4/2003 | Lam et al. |
| 2003/0078064 A1 | 4/2003 | Chan |
| 2003/0081557 A1 | 5/2003 | Mettala et al. |
| 2003/0101329 A1 | 5/2003 | Lahti et al. |
| 2003/0101341 A1 | 5/2003 | Kettler, III et al. |
| 2003/0103484 A1 | 6/2003 | Oommen et al. |
| 2003/0114157 A1 | 6/2003 | Spitz et al. |
| 2003/0119521 A1 | 6/2003 | Tipnis et al. |
| 2003/0119528 A1 | 6/2003 | Pew et al. |
| 2003/0137961 A1 | 7/2003 | Tsirtsis et al. |
| 2003/0153340 A1 | 8/2003 | Crockett et al. |
| 2003/0153341 A1 | 8/2003 | Crockett et al. |
| 2003/0153342 A1 | 8/2003 | Crockett et al. |
| 2003/0153343 A1 | 8/2003 | Crockett et al. |
| 2003/0161298 A1 | 8/2003 | Bergman et al. |
| 2003/0196105 A1 | 10/2003 | Fineberg |
| 2003/0204640 A1 | 10/2003 | Sahinoja et al. |
| 2003/0223381 A1 | 12/2003 | Schroderus |
| 2004/0002326 A1 | 1/2004 | Maher |
| 2004/0032485 A1* | 2/2004 | Stephens, Jr. ............ 348/14.08 |
| 2004/0043775 A1 | 3/2004 | Kennedy |
| 2004/0044623 A1 | 3/2004 | Wake et al. |
| 2004/0047342 A1 | 3/2004 | Gavish |
| 2004/0047461 A1* | 3/2004 | Weisman et al. ....... 379/202.01 |
| 2004/0068724 A1 | 4/2004 | Gardner, III et al. |
| 2004/0098497 A1 | 5/2004 | Banet et al. |
| 2004/0132465 A1 | 7/2004 | Mattila et al. |
| 2004/0150518 A1 | 8/2004 | Phillips et al. |
| 2004/0184584 A1 | 9/2004 | McCalmont |
| 2004/0185875 A1 | 9/2004 | Diacakis et al. |
| 2004/0198332 A1 | 10/2004 | Lundsgaard |
| 2004/0198386 A1 | 10/2004 | Dupray |
| 2004/0203568 A1 | 10/2004 | Kirtland |
| 2004/0205151 A1 | 10/2004 | Sprigg et al. |
| 2004/0229632 A1 | 11/2004 | Flynn et al. |
| 2004/0242238 A1 | 12/2004 | Wang et al. |
| 2005/0028034 A1 | 2/2005 | Gantman et al. |
| 2005/0030977 A1 | 2/2005 | Casey et al. |
| 2005/0039178 A1 | 2/2005 | Marolia et al. |
| 2005/0041578 A1 | 2/2005 | Huotari et al. |
| 2005/0043037 A1 | 2/2005 | Loppe |
| 2005/0086467 A1 | 4/2005 | Asokan et al. |
| 2005/0090236 A1 | 4/2005 | Schwinke et al. |
| 2005/0107673 A1 | 5/2005 | Ball |
| 2005/0112030 A1 | 5/2005 | Gaus |
| 2005/0134504 A1 | 6/2005 | Harwood et al. |
| 2005/0190746 A1 | 9/2005 | Xiong |
| 2005/0209995 A1 | 9/2005 | Aksu et al. |
| 2005/0232252 A1 | 10/2005 | Hoover |
| 2005/0259675 A1 | 11/2005 | Tuohino et al. |
| 2005/0271029 A1* | 12/2005 | Iffland ........................ 370/348 |
| 2006/0008065 A1* | 1/2006 | Longman et al. ............ 379/158 |
| 2006/0023747 A1* | 2/2006 | Koren et al. ................. 370/469 |
| 2006/0053225 A1 | 3/2006 | Poikselka et al. |
| 2006/0072729 A1 | 4/2006 | Lee et al. |
| 2006/0193447 A1 | 8/2006 | Schwartz |
| 2006/0212558 A1 | 9/2006 | Sahinoja et al. |
| 2006/0212562 A1 | 9/2006 | Kushwaha et al. |
| 2006/0233338 A1 | 10/2006 | Venkata |
| 2006/0234639 A1 | 10/2006 | Kushwaha et al. |
| 2006/0234698 A1 | 10/2006 | Fok et al. |
| 2006/0258380 A1 | 11/2006 | Liebowitz |
| 2006/0259365 A1 | 11/2006 | Agarwal et al. |
| 2007/0003024 A1 | 1/2007 | Olivier |
| 2007/0014282 A1 | 1/2007 | Mitchell |
| 2007/0019614 A1 | 1/2007 | Hoffmann |
| 2007/0022011 A1 | 1/2007 | Altberg et al. |
| 2007/0026854 A1 | 2/2007 | Nath et al. |
| 2007/0030539 A1 | 2/2007 | Nath et al. |
| 2007/0049288 A1 | 3/2007 | Lamprecht |
| 2007/0115941 A1 | 5/2007 | Patel |
| 2007/0263610 A1 | 11/2007 | Mitchell |
| 2008/0214202 A1* | 9/2008 | Toomey .................... 455/456.1 |

FOREIGN PATENT DOCUMENTS

| | | |
|---|---|---|
| WO | PCTUS9928848 | 12/1999 |
| WO | PCTUS0146666 | 11/2001 |
| WO | WO2005/051033 | 6/2005 |
| WO | WO2007027166 | 3/2007 |

OTHER PUBLICATIONS

International Search Report in PCT/US2008/01441 dated May 16, 2008.
International Search Report in counterpart application PCT/US06/38947 dated Mar. 6, 2008.
Qualcomm CDMA Technologies, LBS Control Plane/User Plane Overview—80-VD378-1NP B, 2006, pp. 1-36.
Bhalla et al, TELUS, Technology Strategy—LBS Roaming Summit, Sep. 19, 2006.
Alfredo Aguirre, Ilusacell, First and Only Carrier in Mexico with a 3G CDMA Network, 2007.
Mike McMullen, Sprint, LBS Roaming Summit, Sep. 19, 2006.
Andrew Yeow, BCE, LBS Roaming Summit, Sep. 19, 2006, pp. 1-8.
Nars Haran, U.S. Cellular, Packet Data—Roaming and LBS Overview, Nov. 2, 2007, pp. 1-15.
Qualcomm CDMA Technologies, LBS Control Plane Roaming—80-VD377-1NP A, 2006, pp. 1-10.
Qualcomm CDMA Technologies, MS Resident User Plane LBS Roaming—80-VC718-1 E, 2006, pp. 1-37.
Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.
International Search Report in PCT/US2007/23243 dated Apr. 2, 2008.

* cited by examiner

Scenario 1: Provider Directory (B2B – Business to Business, or B2C – Business to Consumer)

Scenario 2 Signal / Call Flow

VOICE OVER INTERNET PROTOCOL (VOIP) LOCATION BASED CONFERENCING

This application is related to and claims priority from a U.S. Provisional Application No. 60/723,960, entitled "Voice Over Internet Protocol (VoIP) Location Based Conferencing", filed on Oct. 6, 2005; U.S. Provisional Application No. 60/733,789, entitled "Voice Over Internet Protocol (VoIP) Multi-User Conferencing", filed on Nov. 7, 2005; and U.S. Provisional Application No. 60/723,961, entitled "Voice Over Internet Protocol (VoIP) Location Based 911 Conferencing", filed on Oct. 6, 2005; the entirety of all three of which are expressly incorporated herein by reference.

BACKGROUND OF THE INVENTION

1. Field of the Invention

This invention relates generally to Voice Over Internet (VoIP) protocols and architectures. More particularly, it relates to location based conferencing services using VoIP.

2. Background of the Related Art

Voice-Over-Internet Protocol (VoIP) is a technology that emulates a phone call, but instead of using a circuit based system such as the telephone network, utilizes packetized data transmission techniques most notably implemented in the Internet.

The use of VoIP technology is growing quickly. Given VoIP technology, there are at least three VoIP scenarios:

1. A VoIP UA that is physically connected to a static data cable at a "home" address. For instance, an Analog Telephone Adapter (ATA) that is connected to the "home" data cable and uses traditional telephone devices.
2. A VoIP UA that is physically connected to a data cable at a location different than its "home" address. For instance, a laptop computer device utilized away from home as a VoIP software telephone would be a VoIP 'visitor' device as described by this scenario.
3. A VoIP UA that is wireless, physically disconnected from any data cable.

In this situation, the VoIP UA connects to the VoIP service provider via either a wide-are wireless technology (e.g., cellular, PCS, WiMAX) or via a local-area wireless technology (e.g., Wireless Fidelity (WiFi), UWB, etc.) Using a laptop computer or handheld device.

VoIP phone calls are routed to a VoIP voice gateway, from which they are passed on to their destination. A VoIP voice gateway or soft switch is a programmable network switch that can process the signaling for all types of packet protocols. Also known as a 'media gateway controller,' 'call agent,' or 'call server,' such devices are used by carriers that support converged communications services by integrating SS7 telephone signaling with packet networks. Softswitches can support, e.g., IP, DSL, ATM and frame relay.

VoIP telephone technology is quickly replacing conventional switched telephone technology. A location of a given VoIP device may be provisioned to be at a given geographic location, or queried from a home location register (HLR) in a mobile system.

With given VoIP technologies, a VoIP user must know the specific phone number of an individual, business, or other entity that they wish to call. There is no conventional technique for allowing a conference call between two or more VoIP users. In the Internet venue, users can find each other using a "chat room", but the burden nevertheless remains on the user to search for, identify, and use a specific phone number or Universal Resource Identifier (URI) information to reach specific entities. This creates inefficiency and lack of flexibility with respect to the desire to establish a conference call, preventing VoIP users from managing their own communication needs and preferences. Generally, voice communication using VoIP technologies is limited to only point-to-point direct links between familiar or previously identified parties.

There is a need for an architecture and methodology that simplifies the complexity of conferencing VoIP calls.

SUMMARY OF THE INVENTION

In accordance with the principles of the present invention, a Voice Over Internet Protocol (VoIP) conference bridge comprises a conference bridge application active in a location addressed using Internet Protocol. A module determines a geographic boundary of a given conference. A plurality of Internet interfaces are provided to the conference bridge application, to accept a respective plurality of VoIP telephone users. Wherein a conference is established between the plurality of VoIP telephone users, each of the plurality of VoIP telephone users being within the geographic boundary.

A method of conferencing Voice Over Internet Protocol (VoIP) voice communications devices in accordance with another aspect of the present invention comprises establishing at least one conference bridge. At least one criteria is defined for participation in the given conference bridge. A VoIP call to the conference bridge is received from an initial VoIP user. A location of the initial VoIP is compared to a location of at least one other VoIP user. An invite message is issued to another VoIP user based on a match of the location of the at least one other VoIP user being within a desired proximity to the location of the initial VoIP user.

DETAILED DESCRIPTION OF ILLUSTRATIVE EMBODIMENTS

A VoIP user from time to time might wish to initiate a conversation with other (known or unknown) VoIP users based on location and other shared attributes/criteria. The need may be for a single point-to-point type connection, or it may extend to the desire for a multi-user conference with other VoIP users.

Existing conferencing systems for putting VoIP users in touch with one another relies upon prior knowledge and contact information existing between the specified users. The present invention provides a way for VoIP users to use VoIP technology to form temporary or permanent "VoIP Communities" or VoIP conferences by initiating an interaction based on location and other shared attributes, supply/demand relationships, or other criteria.

Currently, there is no existing mechanism to create a voice link between VoIP communication devices based on the location of each VoIP user (and potentially other preferences or attributes). Existing VoIP technology does not address this problem for VoIP calls nor does it for any conference established based on location. For instance, while Internet text chat rooms provide a means of communication between party's, Internet text chat rooms do not utilize the user's location to find and invite available individuals/businesses/entities.

The present invention provides the ability for a VoIP user to utilize their own geographic position to narrow down or pinpoint known and even unknown potential VoIP third parties meeting the user's criteria based on their physical location to join in on a phone conference.

Figure 1:
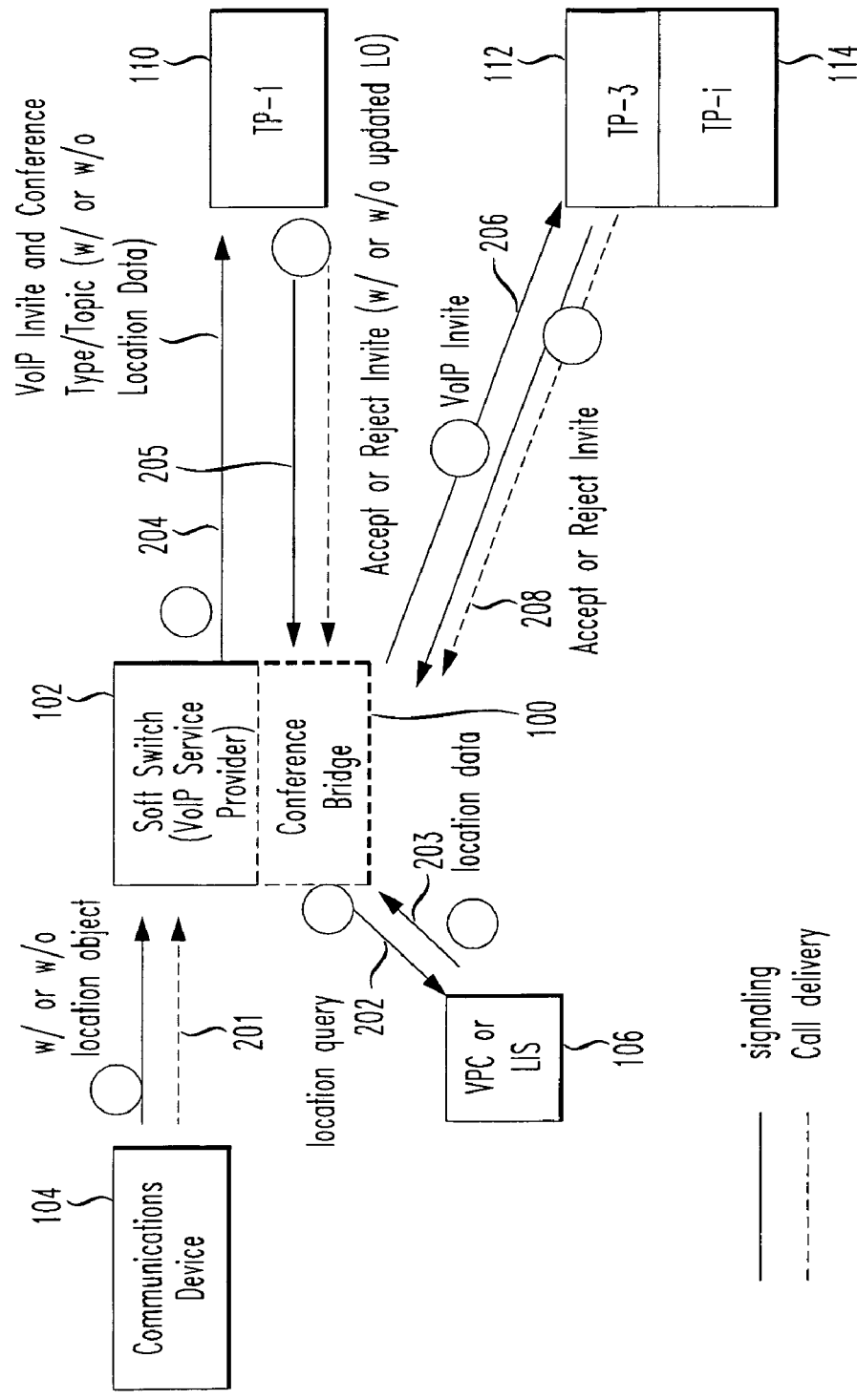
FIG. 1 shows an exemplary architecture of a VoIP conference bridge application operating in a soft switch of a VoIP provider to provide VoIP location based conferencing, in accordance with the principles of the present invention.

FIG. 1 shows an exemplary architecture of a VoIP conference bridge application operating in a VoIP soft switch of a VoIP provider to provide VoIP location based conferencing, in accordance with the principles of the present invention.

In particular, as shown in FIG. 1, a VoIP communications device 104 is serviced by their service provider's soft switch 102. A positioning center 106 provides location data upon request from the soft switch 102. Other VoIP users 110, 112, 114 etc. are potential members of any given conference.

Conference bridges 100 are implemented on the VoIP soft switch 102 located, e.g., at the VoIP service provider's VoIP network.

While the VoIP soft switch 102 is preferably capable of being provisioned with as many VoIP conference bridges 100 as are required in any particular application, only one conference bridge 100 is shown in FIG. 1 for simplicity of explanation.

Also, while the conference bridge 100 is shown implemented in the soft switch 102, it can be embodied within another suitable network element having an Internet Protocol (IP) type connection (e.g., TCP/IP) with the initial user 104 as well as with the potential conferees 110, 112, 114.

The use of a conference bridge 100 eliminates the otherwise conventional requirement that the VoIP user 104 dial digits for a direct link with another specific VoIP communications device 110, 112 or 114. Instead, in accordance with the principles of the present invention, location information relating to the initial VoIP user 104 is passed to the VoIP conference bridge 100, either from the user's VoIP communication device 104 or from their respective location server 106. The location information is then compared by the VoIP soft switch 102 against other VoIP devices 110, 112, 114 etc. to find matching predetermined location-based criteria, e.g., within a geographic vicinity of the user's VoIP communication device 104.

The VoIP soft switch 102 makes use of the location information. Based on the location, the VoIP conference bridge 100 identifies potential other participants to be asked to join the conference currently established by the initial VoIP user 104 on the conference bridge 100, and outputs invites or requests 204 to join that conference 100 to the specific URLs, phone numbers and/or other identifying address information relating to VoIP communications equipment 110, 112, 114 of the potential other participants.

The soft switch 102 also maintains the attributes and rules from other communication devices 110, 112, 114 etc. for receiving conference bridge calls, as well as the fixed location (e.g., a place of business) or the ability to query for a current location (e.g., for mobile communication devices such as mobile phones) for each device. Based on this information, with or without other user input (e.g., to select or prioritize among a list of available third parties), the soft switch 102 invites one or more other communication devices 110, 112, 114, etc. to join the conference bridge. This creates a voice link between the first user 104 and the other third parties 110, 112, 114 without requiring the first user 104 to know the contact information or name of the third parties 110, 112, 114.

Figure 2:
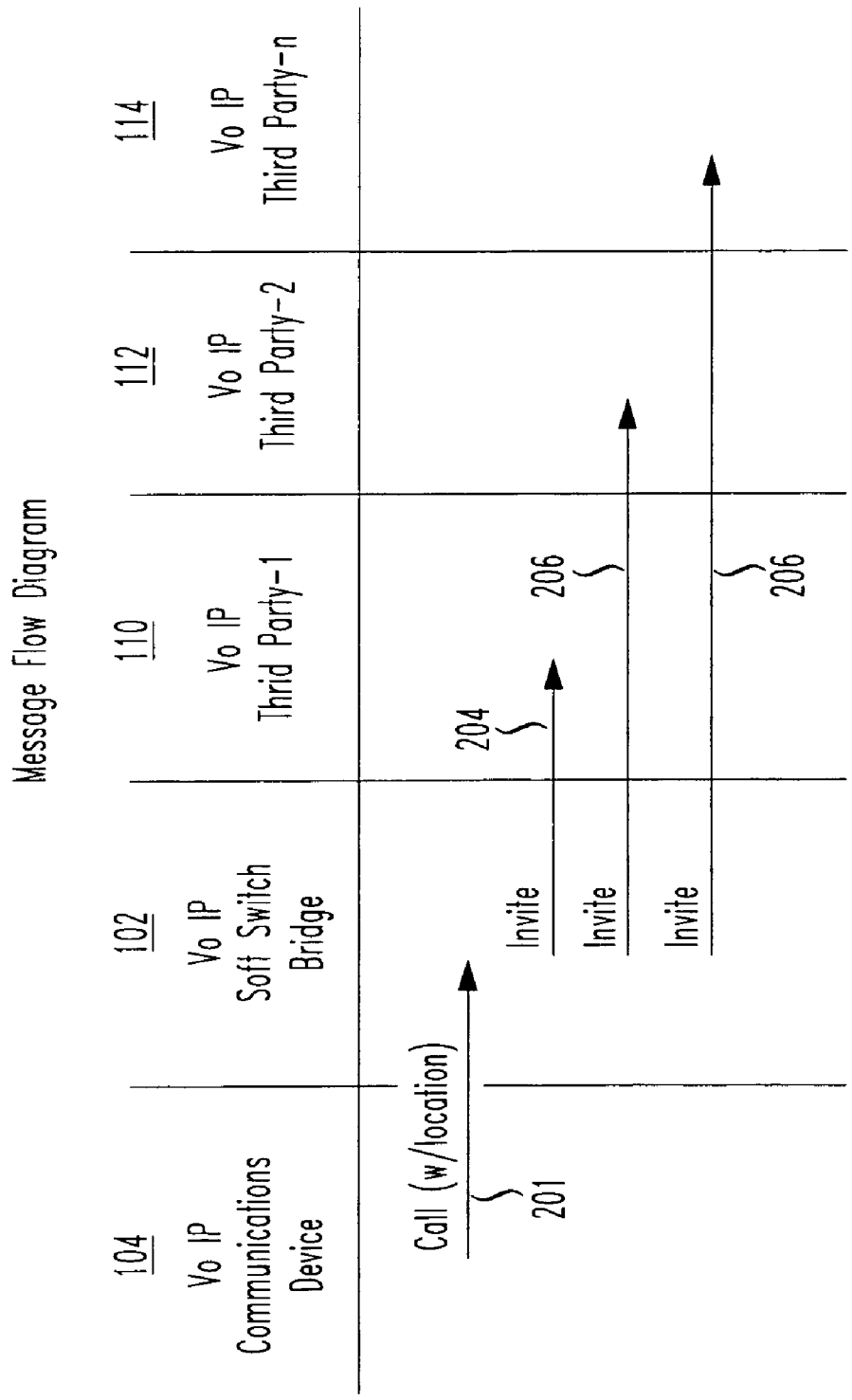
FIG. 2 shows an exemplary message flow diagram for establishing a VoIP location based conference, in accordance with the principles of the present invention.

FIG. 2 shows an exemplary message flow diagram for establishing a VoIP location based conference, in accordance with the principles of the present invention.

In particular, as shown in FIG. 2, the initial VoIP user 104 sends a request for conference bridge call to the soft switch 102. Preferably the initial VoIP user 104 includes location information with the conference request call 201. However, as depicted in FIG. 1, location information can be obtained from an appropriate positioning server 106 if not available from the initial VoIP user 104.

Subsequent to the incoming conference call 201, suitable potential conferees are determined, and those that are within the geographic boundary pre-set or pre-provisioned into the conference bridge are invited with respective invite messages 204, 206.

In operation, the user's VoIP communication device 104 dials a pre-determined phone number (or URL) to initiate a conference bridge 100 on the relevant VoIP soft switch 102. Various phone numbers (or URL's) may be made available at the VoIP conference bridge 100, each corresponding to a respective VoIP conference bridge 100 each with its own pre-established profile of who will be invited once the conference bridge 100 is first entered by the initiating VoIP user 104.

For instance, one VoIP conference bridge 100 may be profiled to invite all other VoIP users within a geographic boundary of, e.g., 1 mile radius from a center point formed by the location of the initiating VoIP user 104. A geographic boundary need not be merely a distance range. For instance, a geographic boundary may comprise, e.g., the grounds of a college or schoolyard, a workplace, etc., or be as specific as those VoIP users within a given room (e.g., gym) at the college or schoolyard. Another VoIP conference bridge 100 with its own phone number may correspond to invites to all other VoIP users 110, 112, 114 etc. currently located in, e.g., a given sports stadium.

The profiles used to identify the potential other VoIP conference participants may provide additional filtering characteristics beyond the location based information, e.g., other VoIP users who are contained not only within the pre-established geographic boundaries set for a given conference bridge 100, but also listed within a 'conference buddy' list pre-listed by the user. Thus, as a result, 'buddies' that a user has pre-listed that are within the sports stadium at the time of the user's call will be invited to join a VoIP conference bridge.

FIG. 1 shows use of a VoIP positioning center (VPC) 106. The VoIP soft switch 102 may receive the user's location information either from each of the VoIP communication devices 104, 110, 112, 114 etc., or from the VPC 106.

The VoIP soft switch 102 preferably uses both the location information of the initiating VoIP user 104, together with any profile criteria set for a given conference bridge 100, to determine a list of potential other conferees to be sent Invite messages inviting them to join the established VoIP conference bridge 100. The profile information for the conference bridge 100 is preferably either pre-established by the VoIP service provider (e.g., to set a geographic boundary within a sports stadium), and/or may be input by the initiating user through keypad entry or voice response on the communications device. Alternatively, profile information for a particular conference bridge may be pre-established via an appropriate web page and transmitted via the Internet to the soft switch 102 or other host gateway.

The VoIP soft switch 102 preferably also maintains the attributes and rules from other VoIP communication devices 110, 112, 114 for receiving conference bridge calls, as well as the fixed location (e.g., a place of business) or the ability to query for a current location (e.g., for mobile communication devices such as mobile phones) for each device. Based on this information, with or without other user input (e.g., to select or prioritize among a list of available third parties), the VoIP soft switch 102 invites one or more other VoIP communication devices 110, 112, 114, etc. to join the VoIP conference bridge 100. This creates a voice link between the first VoIP user 104 that initially called into the VoIP conference bridge 100, and the other potential, third party conferees 110, 112, 114, etc., without requiring the first VoIP user 104 to know the name or even the contact information of the other potential, third party conferees 110, 112, 114, etc.

Upon receipt of an invite to a VoIP conference bridge 204, 206, the potential other VoIP users 110, 112, 114, etc. are preferably notified similar to an incoming telephone call, e.g. with a ring signal, though it may be customized to be distinguished from the sound of an otherwise ordinary incoming phone call. For instance, a given unique phone tone may be activated upon receipt of an invite 204, 206 to a conference bridge 100.

In accordance with the principles of the present invention, the VoIP user(s) 110, 112, 114 receiving invitations to join a VoIP conference 100 may be provided with a filter that automatically rejects any/all invite requests not meeting their own specific criteria (e.g., maintained on their VoIP devices 110, 112, 114 themselves, though such filtering may alternatively be performed at a network level, e.g., at the VoIP soft switch 102 or other centralized location.

Benefits of the invention include that there is no effective limit to the number of participants in the conference VoIP call, there are no cold transfers of a call as VoIP invitees enter or leave the conference bridge 100, and there is the ability to continue the conference call even after the initial VoIP user 104 disconnects.

The present invention has particular applicability with any/all VoIP users, VoIP service providers, and/or even Public Safety Access Points (PSAPs).

Figure 3:
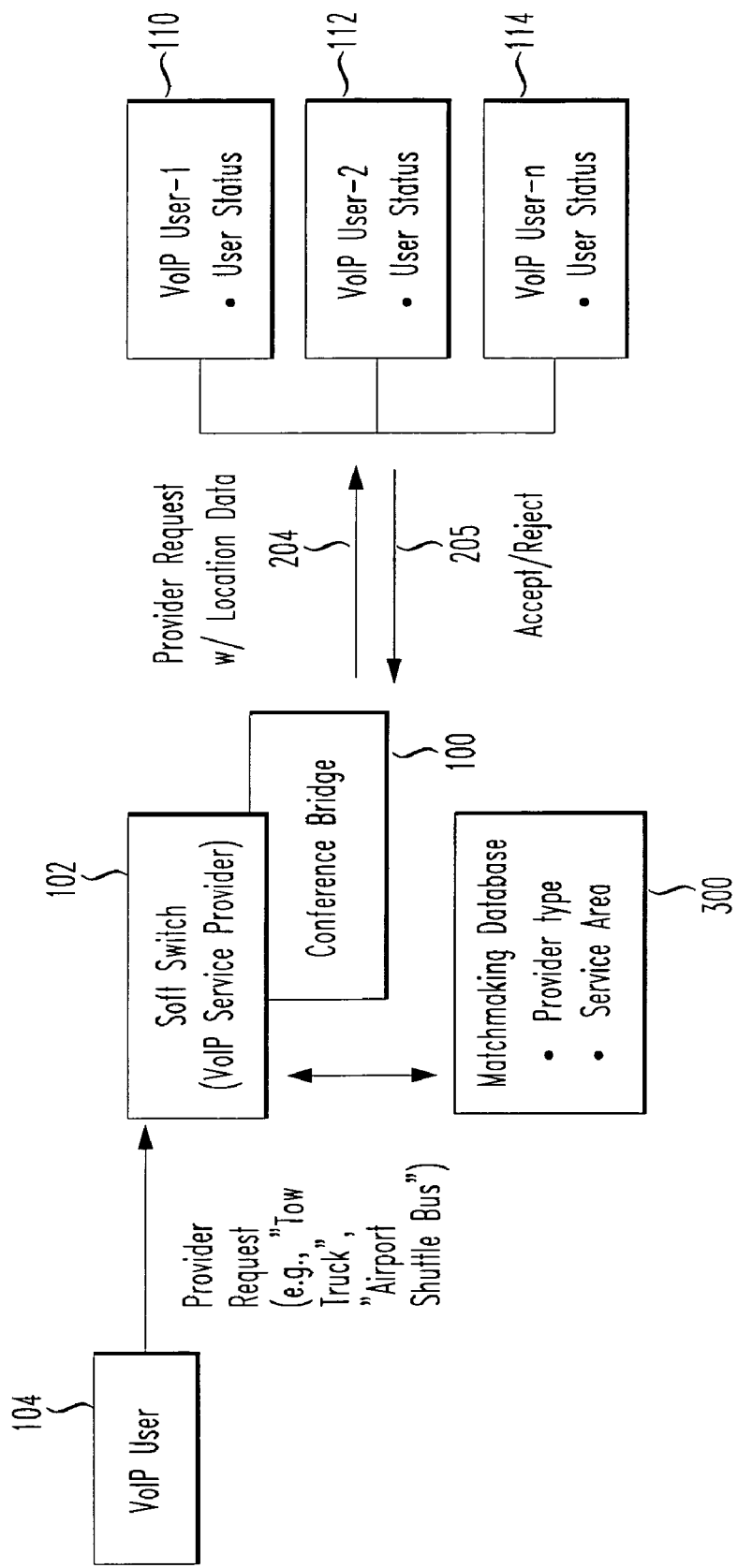
FIG. 3 shows a VoIP user originating an invitation to join a conference bridge in a VoIP soft switch, in a business to business or business to consumer scenario, in accordance with the principles of the present invention.

FIG. 3 shows a VoIP user 104 originating an invitation to join a conference bridge 100 in a VoIP soft switch 102, in a business to business or business to consumer scenario, in accordance with the principles of the present invention.

In particular, as shown in FIG. 3, a VoIP user 104 initiates an invitation or request 204 based on certain pre-defined criteria for a service provider or a peer attribute. The VoIP service provider acquires the user's location information, either directly from the VoIP communications device 104 or by request to the LIS 106, and initiates a conference on the conference bridge 100. The conference bridge 100 issues invitations or notifications to one or more potential VoIP conferee users 110, 112, 114 etc. based on the location of the original user 104 and the specified criteria, by comparison to attribute or provider data for the other VoIP users 110, 112, 114 etc. The conference bridge 100 enables participation by multiple parties and does not depend on the participants' knowledge of or current access to each other's contact information, profile/attributes/business type, or location. In addition, VoIP users can elect when to receive notifications based on their current status (away, available, business hours, etc.)

For instance, the VoIP user 104 would initiate a call to the conference bridge 100, thus initiating the sending of invitations or requests to potential conferees 110, 112, 114 etc. based on certain criteria (e.g., "tow truck drivers currently in Seattle"). Upon receipt of the initial call from the initiating VoIP user 104, the VoIP service provider initiates a conference bridge 100 and issues an Invite or other notification to one or more VoIP users 110, 112, 114 etc. who have selected or subscribed to receive such conference notifications for this particular conference topic (as defined by its criteria). Subscriptions may be semi-permanent criteria for that particular conference bridge 100 (e.g., occupations or interests of the registered user of the relevant VoIP device) or temporary criteria (e.g., passengers on a specific airline flight, ticket agents with extra tickets for a specific event, etc.)

The conference bridge 100 enables participation by multiple parties and does not depend on the participants' knowledge of or current access to each other's contact information. In addition, VoIP users can elect when to receive notifications based on their current status (e.g., away, available).

More sophisticated implementations of the invention include adaptation of the criteria for a given conference bridge 100 to correspond to a particular live auction. For instance, in such application, the matchmaking database 300 functions as an automated auction tool by accepting as criteria for the auction data such as the proposed cost of service, and then connect the lowest bidder of those potential bidders 110, 112, 114 to the conference bridge 100.

Preferably, the initiating VoIP user 104 is allowed to pre-define given criteria for the conference bridge 100, e.g., a maximum number of participants (e.g., the first 4 providers or peers who accept the conference invitation), or other criteria for choosing among multiple users (e.g., to select the VoIP user(s) 110, 112, 114 etc. whose location is closest to the initiating VoIP user 104 who initiated the conference invitation in the first place).

Figure 4:
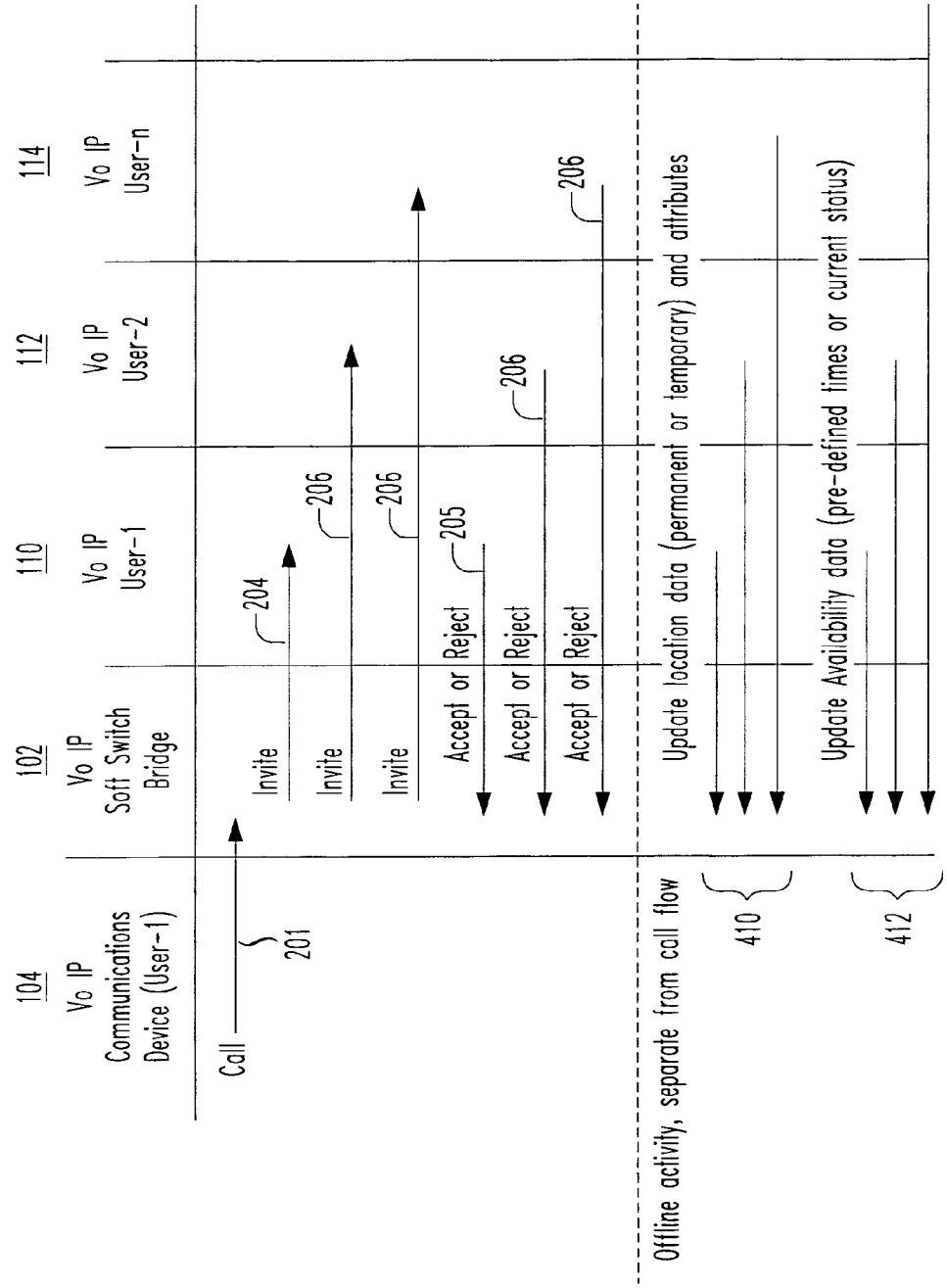
FIG. 4 shows exemplary signal/call flow for a VoIP user originating an invitation to join a conference bridge sent to other VoIP users as shown in FIG. 3.

FIG. 4 shows exemplary signal/call flow for an initiating VoIP user 104 calling to establish a conference bridge 100, causing invitations to be transmitted to each potential VoIP conferee using IP protocol (e.g., TCP/IP) to join the conference bridge 100 as shown in FIG. 3. In response, each invited VoIP user 110, 112, 114 may accept or reject the invitation with an Accept or Reject message transmitted via Internet Protocol back to the VoIP soft switch 102 that transmitted the initial invite messages 204, 206.

Offline activity also occurs, separate from the call flow, e.g., to update location data (be it permanent or temporary) and criteria or attributes for the conference bridge 200 itself. Availability data may also be maintained and updated offline, e.g., relating to pre-defined times for the conference bridge 100 to be established, and/or to the current status of the conference bridge 100.

Figure 5:
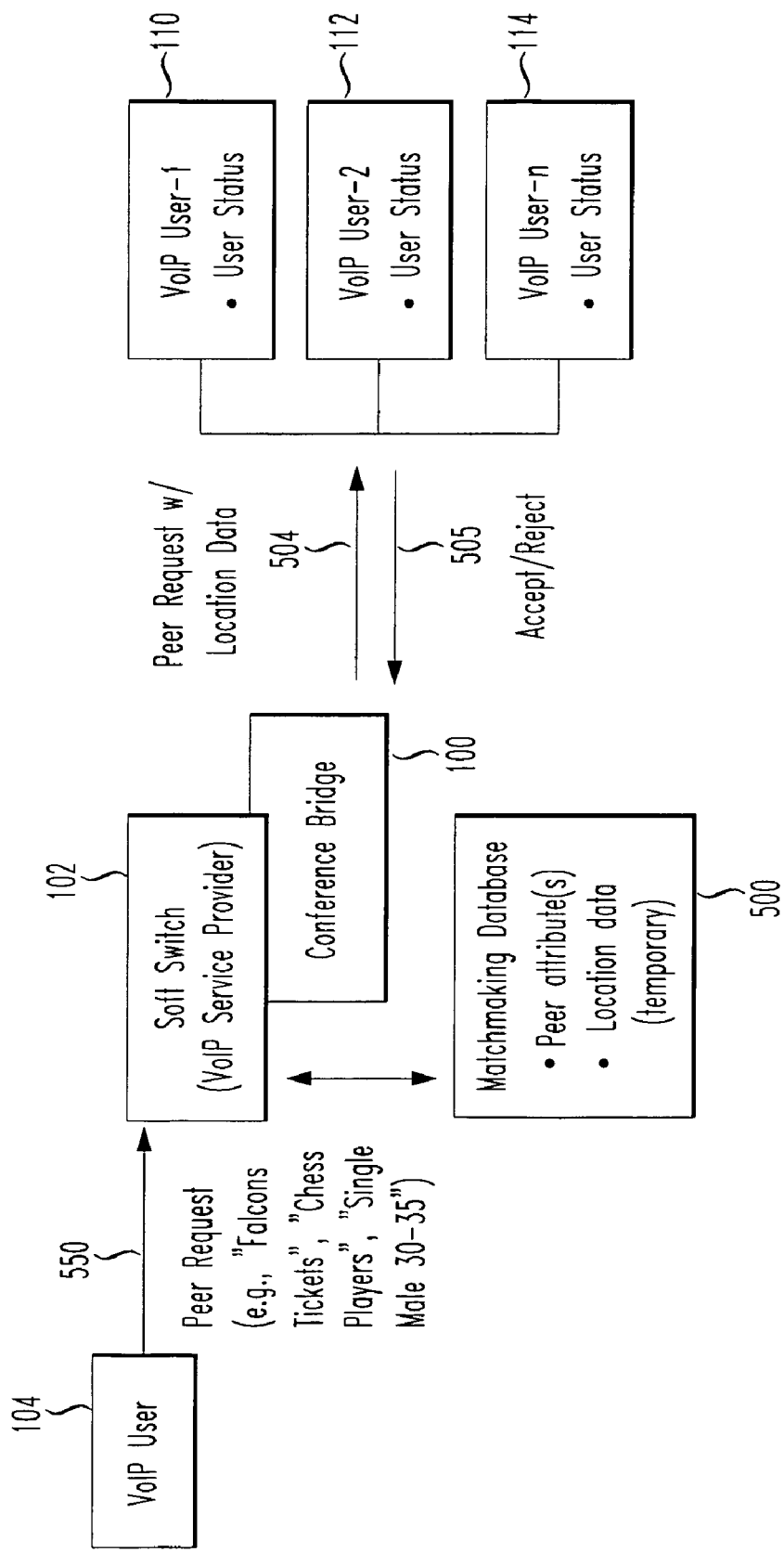
FIG. 5 shows a VoIP user originating the transmission of a series of Invitations to join a conference bridge in a VoIP soft switch, in a peer to peer or consumer to consumer scenario, in accordance with the principles of the present invention.

FIG. 5 shows a VoIP user 104 originating the transmission of a series of Invitations 504 to join a conference bridge 100 in a VoIP soft switch 102, in a peer to peer or consumer to consumer scenario, in accordance with the principles of the present invention.

In particular, as shown in FIG. 5, the VoIP user 104 can call a conference bridge 100 and provide particular, customized criteria for the conference. In a peer-to-peer scenario as shown in FIG. 5, the VoIP user 104 issues a peer-to-peer request 550 such as a call searching for tickets to a specific public event (e.g., "Falcons Tickets"), searching for others with a similar hobby or interest (e.g., "Chess Players"), matchmaking services forming a personal add (e.g., "Male 30-35"), etc.

In the disclosed embodiment, the peer-to-peer conference is initiated by a call by an initiating VoIP user 104. The conference bridge 100 may be pre-established with pre-determined criteria, and the initiating VoIP user 104 merely calls the appropriate conference bridge 100. In such case, the VoIP service provider may establish network-wide criteria itself, or may allow customized conference bridges as a service to their subscribers. Alternatively, the criteria for the conference bridge may be established by the initiating VoIP user 104. The criteria may be transmitted to the soft switch to establish the relevant conference bridge 100 preferably with data contained within the call from the initiating VoIP user 104.

The peer attributes and desired geographical boundaries of the conference are maintained in a matchmaking database 500 in communication with the VoIP soft switch 102 or other gateway that hosts the conference bridge 100.

The VoIP soft switch 102 issues a Peer Request 504 with location data to any/all VoIP users 110, 112 and/or 114 fitting the criteria for the conference. In response, those VoIP users 110, 112 and/or 114 who accept entry into the conference (e.g., by activating an 'Accept' button on the VoIP communications device), return an Accept message 505 to the inviting VoIP soft switch 102. Those VoIP users 110, 112 and/or 114 that don't accept the Invite (either by activating a 'Reject' button on the VoIP communications device, or simply by not responding to the Invite message 204 within a given period of time) return a Reject message 505 to the inviting VoIP soft switch 102.

The invited VoIP users 110, 112, 114 may include a filter allowing through only acceptable Invite messages based on criteria established by or on the receiving VoIP users 110, 112, 114.

Figure 6:
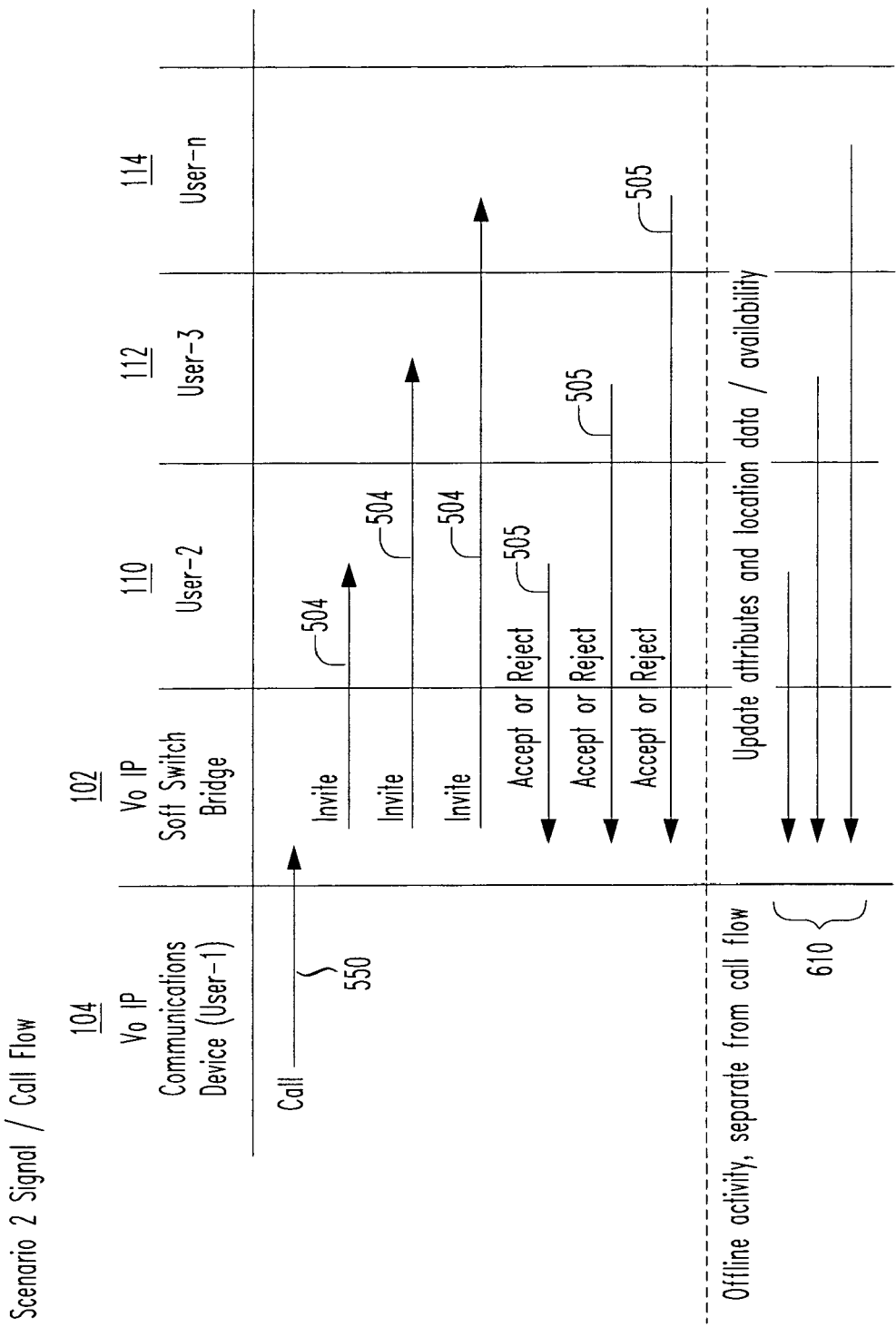
FIG. 6 shows exemplary signal/call flow for a VoIP user originating an invitation to join a conference bridge sent to other VoIP users as shown in FIG. 5.

FIG. 6 shows exemplary signal/call flow for a VoIP user originating an invitation to join a conference bridge sent to other VoIP users as shown in FIG. 5.

In particular, the peer-to-peer request 550 issued by the VoIP user 104 is depicted in FIG. 6, as are the respective Invite messages 504 and Accept or Reject messages 505 from each of the invited VoIP users 110, 112, 114.

The present invention allows VoIP users to find their most appropriate conferees, provider or peer match with minimal user interaction. This is particularly helpful for mobile VoIP users (e.g., while driving, walking, etc.) Moreover, there is no effective limit to the number of participants in the conference call (within network hardware limits of the conference bridge itself). There is also no risk of cold transfers of a VoIP telephone call as participants aren't handled in point-to-point connections that are transferred but rather join or exit an established conference at will. Furthermore, participants in the conference call can continue in the conference even after the initial user disconnects.

Potential markets for the present invention include VoIP service providers who may implement the inventive VoIP multi-user conferencing as a value added services for users. Other uses of the invention include consumer and business VoIP users with respect to commercial, government, educational activities, and Public Safety Access Points (PSAPs), to name a few.

VoIP location based conferencing in accordance with the principles of the present invention has particular applicability with any/all VoIP users, VoIP service providers, and/or Public Safety Access Points (PSAPs).

While the invention has been described with reference to the exemplary embodiments thereof, those skilled in the art will be able to make various modifications to the described embodiments of the invention without departing from the true spirit and scope of the invention.

What is claimed is:

1. A Voice Over Internet Protocol (VoIP) conference bridge, comprising:
   a conference bridge application addressable by an Internet Protocol, said conference bridge application adapted to receive a request to establish a conference comprising at least one user entered customized criteria text string for limiting participation in said establishment of said conference;
   a module to establish a geographic boundary of a given conference; and
   a plurality of Internet interfaces interfaced to said conference bridge application, said plurality of Internet Interfaces accepting communications from a respective plurality of VoIP users;
   wherein said conference is established between said plurality of VoIP users based on said geographic boundary and said user entered customized criteria text string.

2. A method of conferencing Voice Over Internet Protocol (VoIP) voice communications devices, comprising:
   establishing at least one conference bridge;
   receiving at least one user entered customized criteria text string for limiting participation in said given conference bridge;
   receiving a VoIP call to said conference bridge from an initial VoIP user;
   comparing a location of said initial VoIP user to a location of at least one other VoIP user to establish a proximate distance there between; and
   establishing said at least one conference bridge between said VoIP voice communications devices based on said proximate distance and said user entered customized criteria text string.

3. The method of conferencing Voice Over Internet Protocol (VoIP) voice communications device according to claim 2, further comprising:
   requesting a location of said initial VoIP user from a positioning center.

4. The method of conferencing Voice Over Internet Protocol (VoIP) voice communications device according to claim 2, further comprising:
   obtaining a location of said initial VoIP user from said initial VoIP user.

5. The method of conferencing Voice Over Internet Protocol (VoIP) voice communications device according to claim 2, wherein:
   a plurality of conference bridges are established.

6. The method of conferencing Voice Over Internet Protocol (VoIP) voice communications device according to claim 5, wherein:
   said plurality of conference bridges are established on a soft switch.

7. The method of conferencing Voice Over Internet Protocol (VoIP) voice communications device according to claim 6, wherein:
   said soft switch is located in a VoIP service provider's network.

8. The method of conferencing Voice Over Internet Protocol (VoIP) voice communications device according to claim 2, further comprising:
   issuing an invite message to another VoIP user based on a match of said location of said at least one other VoIP user being within a desired proximity to said location of said initial VoIP user.

9. Apparatus for conferencing Voice Over Internet Protocol (VoIP) voice communications devices, comprising:
- means for establishing at least one conference bridge;
- means for receiving at least one user entered customized criteria text string for limiting participation in said given conference bridge;
- means for receiving a VoIP call to said conference bridge from an initial VoIP user;
- means for comparing a location of said initial VoIP user to a location of at least one other VoIP user to establish a proximate distance there between; and
- means for establishing said at least one conference bridge between said VoIP voice communications devices based on said proximate distance and said user entered customized criteria text string.

10. The apparatus for conferencing Voice Over Internet Protocol (VoIP) voice communications device according to claim 9, further comprising:
- means for requesting a location of said initial VoIP user from a positioning center.

11. The apparatus for conferencing Voice Over Internet Protocol (VoIP) voice communications device according to claim 9, further comprising:
- means for obtaining a location of said initial VoIP user from said initial VoIP user.

12. The apparatus for conferencing Voice Over Internet Protocol (VoIP) voice communications device according to claim 9, wherein:
- said means for establishing at least one conference bridge establishes a plurality of conference bridges.

13. The apparatus for conferencing Voice Over Internet Protocol (VoIP) voice communications device according to claim 12, wherein:
- said plurality of conference bridges are established on a soft switch.

14. The apparatus for conferencing Voice Over Internet Protocol (VoIP) voice communications device according to claim 13, wherein:
- said soft switch is located in a VoIP service provider's network.

15. The apparatus for conferencing Voice Over Internet Protocol (VoIP) voice communications device according to claim 9, further comprising:
- means for issuing an invite message to another VoIP user based on a match of said location of said at least one other VoIP user being within a desired proximity to said location of said initial VoIP user.

* * * * *